April 29, 1952 — J. M. LAW — 2,594,319
AUTOMOBILE LUGGAGE CARRIER
Filed Sept. 9, 1950 — 2 SHEETS—SHEET 1
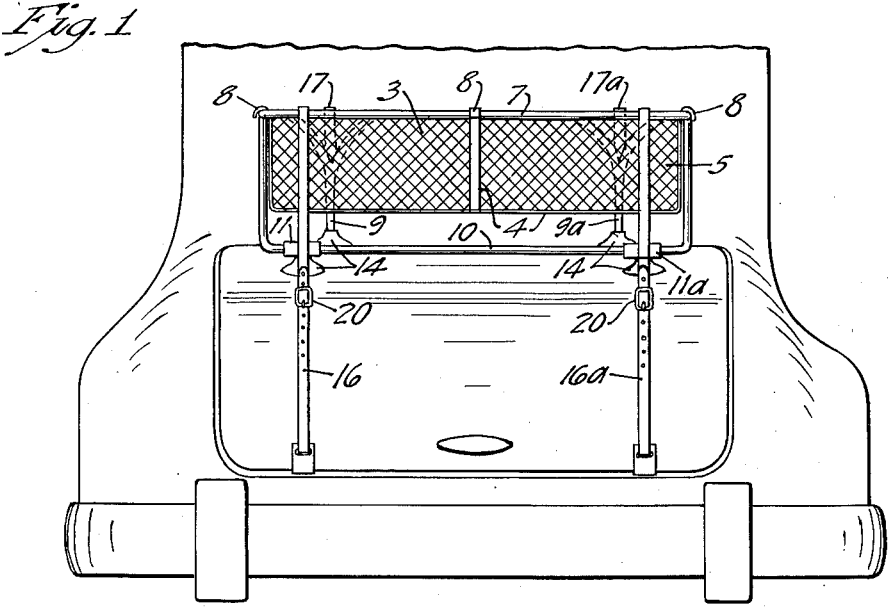
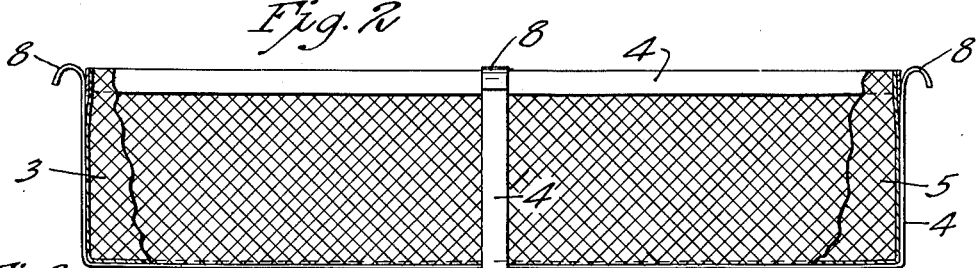
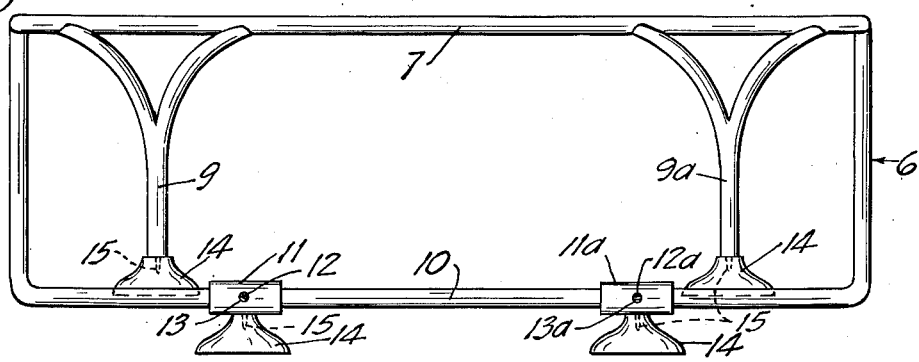
Inventor
JOHN MILTON LAW
By Mark W. Zelian
Attorney April 29, 1952 — J. M. LAW — 2,594,319
AUTOMOBILE LUGGAGE CARRIER
Filed Sept. 9, 1950 — 2 SHEETS—SHEET 2
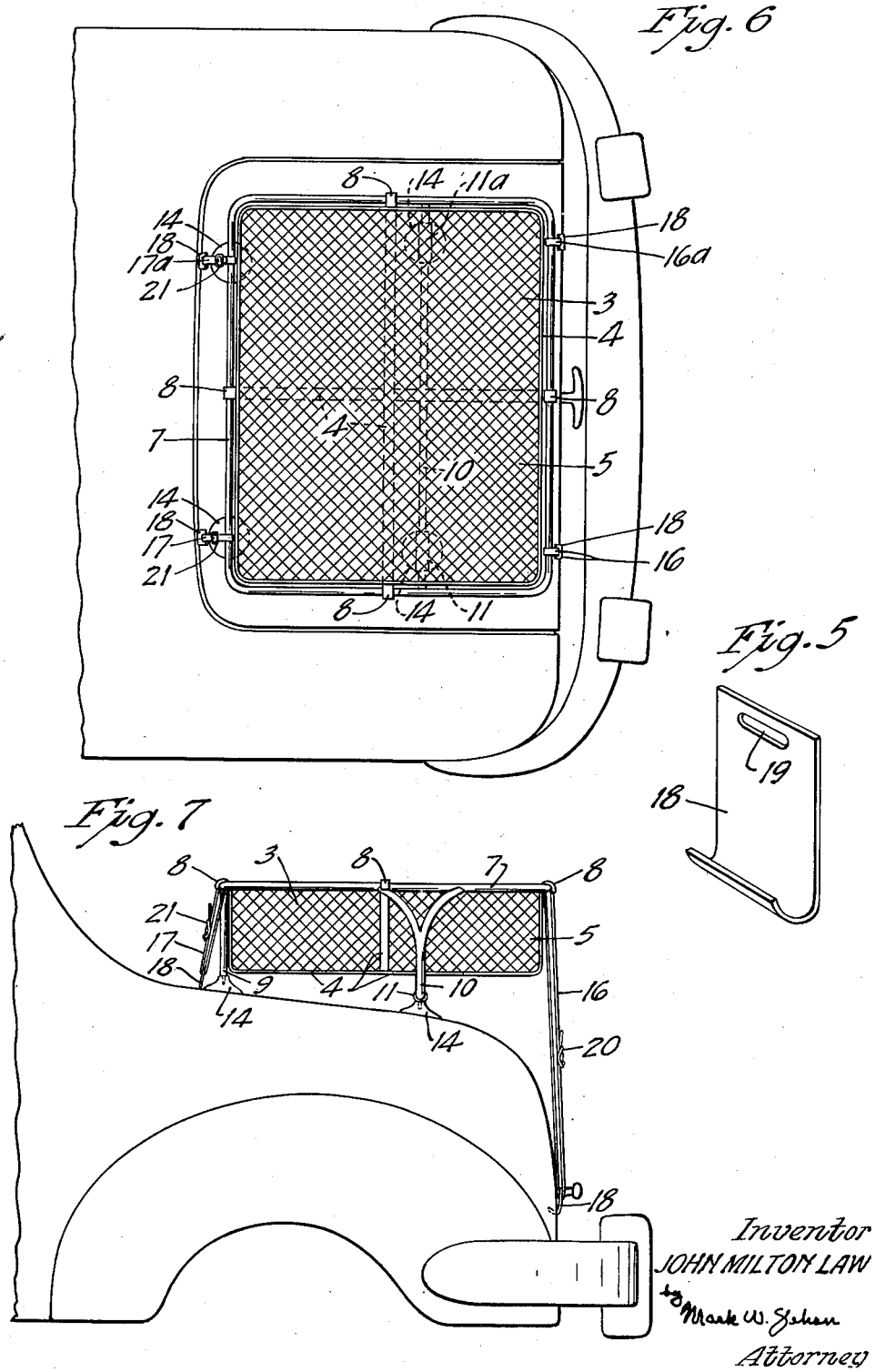
Inventor
JOHN MILTON LAW

Patented Apr. 29, 1952

2,594,319

UNITED STATES PATENT OFFICE 2,594,319

AUTOMOBILE LUGGAGE CARRIER

John Milton Law, South St. Paul, Minn.

Application September 9, 1950, Serial No. 184,014

5 Claims. (Cl. 224—29)

This invention relates to a carrier for luggage and more specifically to an apparatus for carrying luggage and the like on the top of the rear trunk of automobiles.

There have been many attempts in the past to provide apparatus for attachment to an automobile whereby luggage in excess of the amount which can be accommodated in the inside of the car and in the trunk thereof can be transported. Early forms of such apparatus included the familiar extendible upright runner for attachment to the outside edge of an automobile running board. Although such runners were reasonably satisfactory, they have long since become outmoded by reason of the fact that modern automobiles do not have running boards. More recent attempts to provide luggage carriers for automobiles have consisted of various devices intended to be attached to the top of the car. These devices have been very unsatisfactory for numerous reasons. First, the fact that they are intended for attachment to the top of the car has made them extremely difficult to load and unload. Second, because of their position on the top of the car, there is considerable danger that articles packed within them will be blown loose when the vehicle to which they are attached is moving at high speed over the highway. Third, the placement of the baggage on the top of the car, in position directly exposed to the air stream created by the moving vehicle, results in considerably reduced automobile mileage and thus increased expense for the trip.

This invention overcomes the disadvantages of the prior art devices and has the following among its objectives:

To provide an automobile luggage carrier which can be attached to the top of the rear trunk of a car rather than to the top or side thereof.

To provide a carrier of the kind above stated which is adjustable to fit different makes of cars.

To provide a carrier which can be easily loaded and unloaded.

To provide a carrier which is sturdy, light in weight and which can be easily manufactured at a relatively low cost.

To provide a carrier which when mounted, will not interfere with the opening and closing of the trunk door.

To provide a carrier which will not mar or scratch the surface of the car, and which may be attached to the car very quickly and easily.

The foregoing, and the further objects and advantages as will appear or be pointed out as this description proceeds are contained in the structural embodiment illustrated in the accompanying drawing in which:

Figure 1 is a rear elevational view showing the luggage carrier mounted upon an automobile.

Figure 2 is a rear elevational view of the basket portion of the carrier.

Figure 3 is a rear elevational view of the rack portion of the carrier.

Figure 4 is a detailed view of the sleeve and suction cup shown in Figure 3.

Figure 5 is a detail view of the trunk clip shown in Figure 1.

Figure 6 is a plan view of the luggage carrier mounted upon an automobile.

Figure 7 is a side elevational view of the carrier mounted upon an automobile.

Referring now to the drawings in more detail, the apparatus of my invention comprises first, a luggage holding basket, indicated generally by the reference character 3. Said basket is of rectangular shape generally conforming to, but somewhat smaller than, the area defined by the rear trunk door of an automobile. Said basket may be of any desired depth, but I have found that a basket eight inches deep is sufficient to adequately hold most luggage. The basket may, as illustrated, be fabricated from metal band 4 and expanded metal or metal lath 5. I have found that a sturdy, serviceable basket is obtained by using only a minimum amount of metal band, the expanded metal being strong enough to support most types of luggage. In the carrier illustrated in the accompanying drawings, I have used band 4 only to reinforce the upper rim of the basket and to support the bottom of the basket by bisecting it in each direction, particularly as shown in Figure 6. While I do not intend to limit myself to a basket of any particular dimensions, it may be stated that a basket 34 inches wide by 28 inches long is particularly advantageous in that it will fit most modern low priced cars. Of course, in the event that my carrier were to be especially made for a particular type of automobile, other dimensions might be more suitable.

Basket 3 is placed in and supported by rack 6. Said rack comprises, first, a rectangular frame 7 slightly longer and wider than basket 3. Basket 3 is suspended within said frame 7 by means of hooks 8, which in the embodiment illustrated, take the form of turned over end portions of metal bands 4.

Integrally joined to and extending downwardly from the front end of frame 7 are supports 9 and 9a. In order to provide an extra margin of strength in the carrier for those instances where it is desired to carry a heavy load of luggage, it is preferred that said supports be Y-shaped so that there will be four points of contact between them and the frame 7. Said supports 9 and 9a should be somewhat longer than basket 3 is deep to insure that said basket will ride well above the surface of the automobile even when said basket is fully loaded. On the other hand, the supports should not be overly long or the convenience of the carrier, in respect to loading and unloading, will be diminished. I have found, when using a basket 8 inches deep, that 10 inches is about right for the length of frontal supports 9 and 9a. I also have found that said supports fit well to the contours of most automobile trunks if they are spaced about 24 inches apart.

Supporting the rear portion of frame 7 is transverse bar 10, the end portions of which have been turned up and welded or otherwise permanently affixed to frame 7. Again, to provide added strength, I prefer that said turned up end portions terminate in a Y-shape to provide multiple points of contact with frame 7. Slidably mounted upon bar 10 are sleeves 11 and 11a. Said sleeves are slidable along the length of bar 10 to permit adjustment of the carrier to fit snugly upon trunk doors of various shapes and conformation. Said sleeves are also rotatable around the circumference of bar 10 so that they will be adjustable in that direction as well. There is thus provided a rear supporting means which will function on a wide variety of trunk doors. Extending radially of sleeves 11 and 11a, are threaded holes 12 and 12a for the reception of thumb screws or set screws 13 and 13a. Thus, when the carrier has been adjusted to fit the particular car on which it is to be used, sleeves 11 and 11a may be held in the desired position by the advancement of said screws to bear on bar 10.

In order for my carrier to be successfully used on the largest possible variety of cars, I have found that rear supporting bar 10 should be affixed to frame 7 well forward of the rearmost end of said frame. For example, in a frame 30 inches long, I have found it most advantageous to affix the bar to the frame about 12 inches from the back end of the frame, thereby insuring that bar 10 will be above a relatively horizontal portion of the trunk door when the carrier is properly mounted thereupon. If said bar 10 is placed too far toward the rear end of frame 7, it will, when the carrier is mounted, overlie a more or less vertcial portion of the automobile and thus lack a surface upon which it can securely rest.

In view of the fact that the trunks on modern automobiles slope somewhat toward the rear of the car, it is necessary that the turned up end portions of bar 10 be somewhat longer than frontal supports 9 and 9a so that the carrier will be in a horizontal position when mounted on the car. In a carrier having the approximate dimensions hereinabove indicated, I have found that a 2 inch difference in length is about right; that is, if frontal supports 9 and 9a are 10 inches long, the turned up end portions of bar 10 should be about 12 inches long.

Attached to the bottom tips of frontal supports 9 and 9a and also to the periphery of sleeves 11 and 11a, are suction cups 14. These cups serve to support the rack away from the surface of the automobile, and, of course, also aid in maintaining the carrier in proper position. Said cups may be threaded on to screws 15 or may be attached to the supports in various other ways, but it is desirable that they be easily removable in the event their replacement by new cups becomes necessary.

When mounted in proper position upon the trunk door, the carrier is held secure by straps 16 and 16a in the rear and by straps 17 and 17a in the front. Each of said straps is looped about frame 7 and thence downwardly through clip 18 provided with slot 19. The hook portions of clips 18 upon straps 16 and 16a are then inserted under the lower edge of the trunk door and belt buckles 20 are tightened to hold the carrier in position. Similarly, clips 18 upon straps 17 and 17a are inserted within the crevice adjacent the front hinges of the door, and straps 17 and 17a are then tightened and so held by buckles 21. In addition to holding the carrier downwardly against the car, straps 17 and 17a serve to prevent backward sliding motion of the apparatus.

Clips 18 should of course be strong enough to withstand considerable pulling force without being deformed. On the other hand, however, they should be thin enough to be easily inserted under the trunk door. In the apparatus which I have made in the practice of this invention, I have fabricated the clips from 16 gauge steel and they have functioned very satisfactorily in all respects.

Further, in the carrier which I have constructed, I have made rack 6 (comprising supports 9 and 9a, bar 10 and frame 7) from ¾" steel tubing, all welded. While it will be obvious that many other materials could be used, I have found that the above fulfills the requirements of strength, low cost, and easy workability.

It is believed that the operation and use of my invention has been fully described and disclosed in the foregoing description of my invention which is intended to be illustrative and not limited except by the scope of the claims appended hereto.

What I claim is:

1. A luggage carrier adapted to be mounted upon the trunk of an automobile, comprising a rectangular luggage-receiving basket and a basket-supporting rack, said basket having outwardly facing hooks affixed about its rim, said rack comprising a rectangular frame slightly longer and wider than said basket, a plurality of front legs of length greater than the depth of said basket affixed to the front end of said frame, a first side leg affixed to the rear end portion of a side of the frame, a second side leg affixed to the other side of the frame in opposed relation to said first side leg, and a horizontal bar affixed to and connecting the lower ends of said side legs, said bar being of circular cross section and being fitted with slidable and rotatable sleeves, said front legs and the sleeves on said horizontal bar being provided with suction cups adapted to rest on the surface of the automobile, said side legs being longer than said front legs by an amount sufficient to maintain said frame in horizontal position over said automobile trunk, said basket being suspendable within said rack by said hooks overlying said frame, said luggage carrier being securely positioned upon said automobile trunk doors by straps attached to the rack and to the automobile.

2. A luggage carrier adapted to be mounted upon the sloping trunk door of an automobile, comprising a luggage-receiving basket and a basket-supporting rack, said basket comprising a body portion and a rim portion having hook members extending outwardly therefrom, said rack comprising a flat frame and frontal and rear supports therefor, said frame being of a size and configuration through which the body portion but not the rim portion of said basket will narrowly pass bottom first, said frontal supports being upright members of a length greater than the depth of said basket and being integrally attached at their upper ends to the front portion of said frame and being cushioned at their lower ends to rest upon the surface of the automobile, said rear supports comprising upright members and a sleeve-bearing horizontal bar, said upright members being integrally attached at their upper ends to the rear portion of the frame and at their lower ends to the horizontal bar, the sleeves on said bar being cushioned, slidable along the length of the bar and rotatable about the perimeter of the bar for adjustment to fit flush upon the surface of the automobile, said upright members of the rear support being sufficiently longer than the upright members comprising the frontal support to maintain said frame in substantially horizontal position over the sloping trunk door of the automobile, said luggage-receiving basket being suspendable within the supporting rack away from the surface of the automobile by said rim hook members overlying the frame; said luggage carrier being securely positioned upon the trunk door by straps attached to the rack and to the automobile.

3. A luggage carrier adapted to be mounted upon the trunk door of an automobile, comprising a rectangular luggage-receiving basket shorter than the length of and narrower than the width of the automobile trunk door, and a rack for suspending said basket in horizontal position over said trunk door, said rack comprising a rectangular frame slightly longer and wider than said basket, a plurality of front legs affixed to the front end of said frame, a first side leg affixed to a side of the frame, a second side leg affixed to the other side of the frame in opposed relation to said first side leg, and a transverse bar affixed to and connecting the lower ends of said side legs, all of said legs being longer than the depth of said basket and said side legs being longer than said front legs, said basket being inserted bottom first into said frame, the rim of said basket being provided with members extending outwardly over said frame to prevent complete passage of said basket through said frame, said transverse bar being fitted with sleeves adjustable along the length of and about the longitudinal axis of said bar, said front legs and said sleeves being provided with suction cups adapted to rest upon the surface of the automobile without damage thereto, said luggage carrier being securely positioned upon the trunk door by straps attached to the rack and to the automobile.

4. A luggage carrier adapted to be mounted upon the trunk door of an automobile, comprising a rectangular luggage-receiving basket and a rack for suspending said basket over and spaced from the automobile trunk door, said rack comprising a rectangular frame slightly longer and wider than said basket and a plurality of supports for maintaining said frame on a substantially horizontal plane a distance upwardly from the surface of the automobile greater than the depth of said basket, the bottom portions of said supports being provided with suction cups adapted to rest upon the surface of the automobile without damage to said automobile, said rack being held in position by straps attached to the frame and to the automobile, said basket being inserted bottom first into said frame, the rim of said basket being provided with members extending outwardly over said frame to prevent complete passage of said basket through said frame.

5. A luggage carrier adapted to be mounted upon an automobile, comprising a luggage-receiving basket and a rack for suspending said basket over and spaced from said automobile, said rack comprising a frame and a plurality of adjustable supports for maintaining said frame on a substantially horizontal plane a distance upwardly from the surface of said automobile greater than the depth of said basket, said supports being cushioned at their bottom ends to rest upon the surface of said automobile, said frame being of a size and configuration through which the body portion of said basket will pass, the body portion of said basket being inserted into said frame, the rim portion of said basket being provided with members extending outwardly over said frame to prevent complete passage of said basket through said frame, means being provided for securing said rack upon said automobile.

JOHN MILTON LAW.

REFERENCES CITED

The following references are of record in the file of this patent:

UNITED STATES PATENTS

| Number | Name | Date |
|---|---|---|
| 1,748,282 | Ellis | Feb. 25, 1930 |
| 2,009,721 | Williams | July 10, 1935 |
| 2,106,503 | Hendrick | Jan. 25, 1938 |
| 2,204,432 | Morgadanes | June 11, 1940 |
| 2,409,103 | Cameron | Oct. 8, 1946 |